United States Patent
Duda et al.

(10) Patent No.: US 9,685,202 B1
(45) Date of Patent: Jun. 20, 2017

(54) NEAR-FIELD TRANSDUCER HAVING ENLARGED PORTION MATCHING OUTLINE SHAPE OF HEAT SINK

(71) Applicant: Seagate Technology LLC, Cupertino, CA (US)

(72) Inventors: John Charles Duda, Bloomington, MN (US); Scott M. Franzen, Savage, MN (US); Weibin Chen, Bloomington, MN (US); Tae-Woo Lee, Eden Prairie, MN (US); Dimitar V. Dimitrov, Edina, MN (US); Huaqing Yin, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/002,663

(22) Filed: Jan. 21, 2016

Related U.S. Application Data

(60) Provisional application No. 62/106,322, filed on Jan. 22, 2015.

(51) Int. Cl.
| | | |
|---|---|---|
| *G11B 11/00* | (2006.01) | |
| *G11B 33/14* | (2006.01) | |
| *G11B 5/012* | (2006.01) | |
| *G11B 5/187* | (2006.01) | |
| *G11B 5/127* | (2006.01) | |
| *G11B 5/00* | (2006.01) | |
| *G11B 11/105* | (2006.01) | |
| *G11B 5/31* | (2006.01) | |
| *G11B 5/60* | (2006.01) | |

(52) U.S. Cl.
CPC .......... *G11B 33/1426* (2013.01); *G11B 5/012* (2013.01); *G11B 5/1272* (2013.01); *G11B 5/187* (2013.01); *G11B 5/314* (2013.01); *G11B 5/6088* (2013.01); *G11B 11/10532* (2013.01); *G11B 11/10543* (2013.01); *G11B 11/10554* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,286,329 B1 * | 10/2012 | Zhao ................ | G11B 5/3133 |
| | | | 29/592.1 |
| 8,514,673 B1 | 8/2013 | Zhao et al. | |
| 9,099,117 B2 * | 8/2015 | Wessel .............. | G02B 6/1226 |
| 9,196,279 B2 * | 11/2015 | Seets ................ | G11B 5/3163 |
| 9,245,573 B2 * | 1/2016 | Sahoo ............... | G11B 5/314 |
| 9,281,002 B2 * | 3/2016 | Brons ............... | G11B 5/314 |
| 2011/0205863 A1 * | 8/2011 | Zhao ................. | B82Y 10/00 |
| | | | 369/13.33 |

(Continued)

*Primary Examiner* — Tan X Dinh
(74) *Attorney, Agent, or Firm* — Hollngsworth Davis, LLC

(57) ABSTRACT

A near-field transducer includes an enlarged portion and a peg protruding from a first edge. The enlarged portion has a second edge facing away from the first edge. The near-field transducer includes a heat sink disposed on the enlarged portion and with an outline shape that matches that of the enlarged portion. The heat sink is disposed at a first separation distance from the first edge of the enlarged portion and a second, greater, separation distance from the second edge of the enlarged portion. The first separation distance is greater than the second separation distance.

19 Claims, 12 Drawing Sheets

(56) References Cited

U.S. PATENT DOCUMENTS

| | | | | |
|---|---|---|---|---|
| 2012/0045662 A1* | 2/2012 | Zou | G11B 5/3133 | 369/13.32 |
| 2013/0107679 A1* | 5/2013 | Huang | G11B 13/08 | 369/13.32 |
| 2013/0286799 A1* | 10/2013 | Zhu | G11B 13/08 | 369/13.33 |
| 2013/0286804 A1* | 10/2013 | Zhao | G11B 13/04 | 369/13.33 |
| 2015/0043315 A1* | 2/2015 | Chen | G11B 5/3133 | 369/13.33 |
| 2015/0162030 A1* | 6/2015 | Jayashankar | G11B 5/3163 | 369/13.33 |
| 2015/0340052 A1* | 11/2015 | Sankar | G11B 5/6088 | 369/13.33 |
| 2016/0189735 A1* | 6/2016 | Jayashankar | G11B 5/314 | 427/526 |
| 2016/0351209 A1* | 12/2016 | Chen | G11B 5/314 | 369/13.33 |
| 2016/0351210 A1* | 12/2016 | Blaber | G11B 5/6082 | 369/13.33 |
| 2016/0351211 A1* | 12/2016 | Blaber | G11B 5/314 | 369/13.33 |
| 2016/0351214 A1* | 12/2016 | Kautzky | G11B 5/3169 | 369/13.33 |
| 2016/0351221 A1* | 12/2016 | Blaber | G11B 5/6088 | 369/13.33 |
| 2016/0351222 A1* | 12/2016 | Blaber | G11B 5/6082 | 369/13.33 |

* cited by examiner

NEAR-FIELD TRANSDUCER HAVING ENLARGED PORTION MATCHING OUTLINE SHAPE OF HEAT SINK

RELATED PATENT DOCUMENTS

This application claims the benefit of Provisional Patent Application Ser. No. 62/106,322 filed on Jan. 22, 2015, to which priority is claimed pursuant to 35 U.S.C. §119(e), and which is incorporated herein by reference in its entirety.

SUMMARY

Embodiments described herein are directed to a near-field transducer with an offset heat sink. In one embodiment, a near-field transducer includes an enlarged portion and a peg. The peg protrudes from a first edge of the enlarged portion that faces a recording medium. The enlarged portion has a second edge facing away from the recording medium. The near-field transducer includes a heat sink disposed on the enlarged portion and having an outline shape that matches that of the enlarged portion. The heat sink is disposed at a first separation distance from the first edge of the enlarged portion and a second separation distance from the second edge of the enlarged portion. The first separation distance is greater than the second separation distance.

In another embodiment, a method involves forming a unitary base part of a near-field transducer onto a substrate. The unitary base part includes an enlarged portion and a peg protruding from a first edge of the enlarged portion. A unitary heat sink is formed onto the unitary base part. The unitary heat sink has an outline shape matching that of the enlarged portion.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

The present disclosure generally relates to a near-field transducers used in heat-assisted media recording (HAMR) data storage devices. This technology, also referred to as energy-assisted media recording (EAMR), thermally-assisted media recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

A HAMR read/write head may include an integrated waveguide that delivers light from the energy source to a near-field transducer (NFT) that is held close to a magnetic recording medium. The NFT may also be referred to as a plasmonic transducer, plasmonic antenna, near-field antenna, nano-disk, nan-patch, nano-rod, etc. The light generates a surface plasmon field on the NFT, and the surface plasmons are directed out of a surface of the write head onto the magnetic recording medium. This creates a hotspot on the recording medium, lowering its magnetic coercivity and enabling a local magnetic field generated by a write pole to write data to the hotspot.

Due to the ability to generate a small hotpot, a HAMR can achieve higher areal density than conventional magnetic data storage techniques, e.g., perpendicular recording. One design goal in a HAMR device is to achieve sharp thermal gradients at the boundaries of the hotspot on the media. Sharp thermal gradients help ensure well defined magnetic transitions, and among other things, reduces bit error rate when reading back the recorded data. As will be described below, a particular NFT design using a disk, peg, and heat sink can exhibit improved thermal gradient by manufacturing parts of the NFT as unitary components, and by making certain adjustments to relative orientation of the heat sink relative to the disk and peg.

Figure 1:
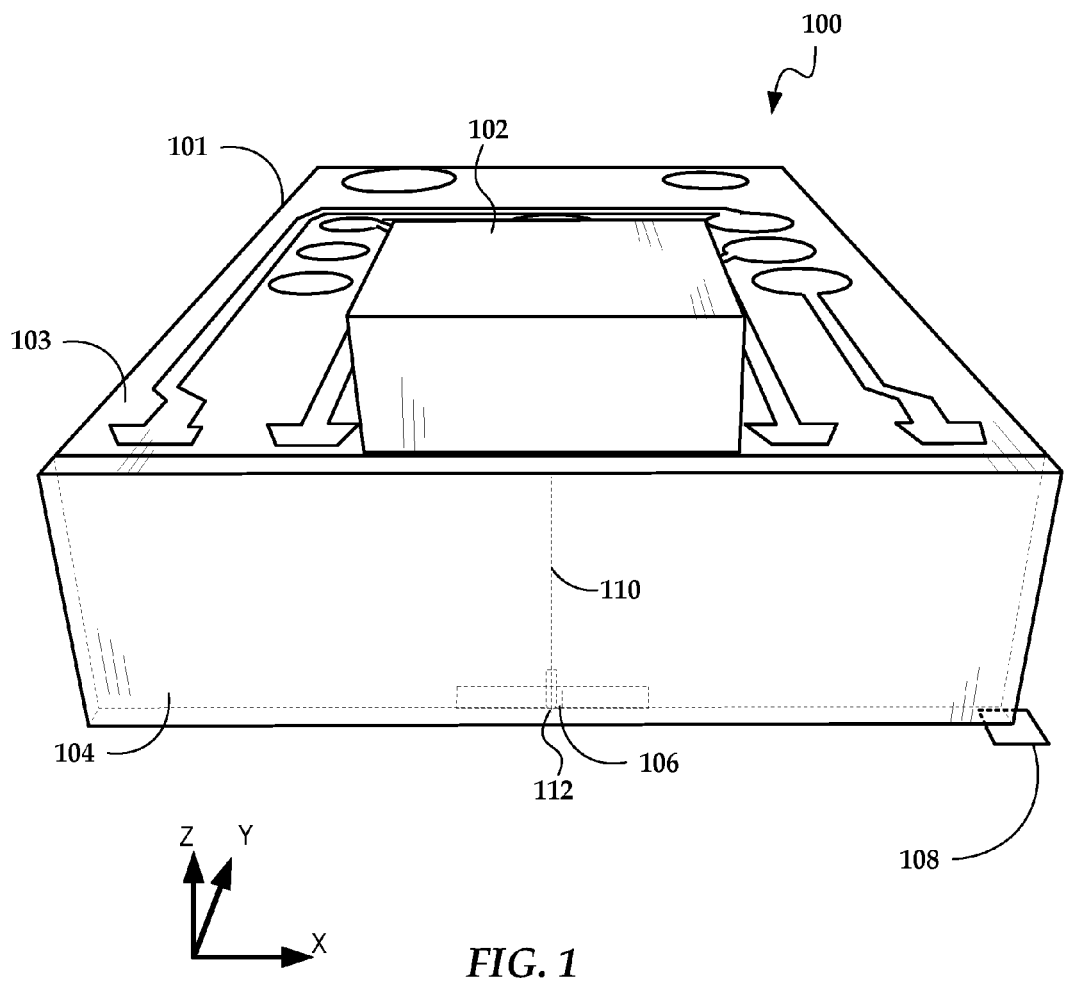
FIG. 1 is a perspective view of a slider assembly according to an example embodiment.

In reference to FIG. 1, a perspective view shows a HAMR write head 100 according to an example embodiment. The write head 100, which may also be referred to as a recording head, read/write head, read head, slider, etc., includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative z-direction in this view).

While the example in FIG. 1 shows a laser diode 102 directly mounted to the slider body 101, the energy delivery system discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
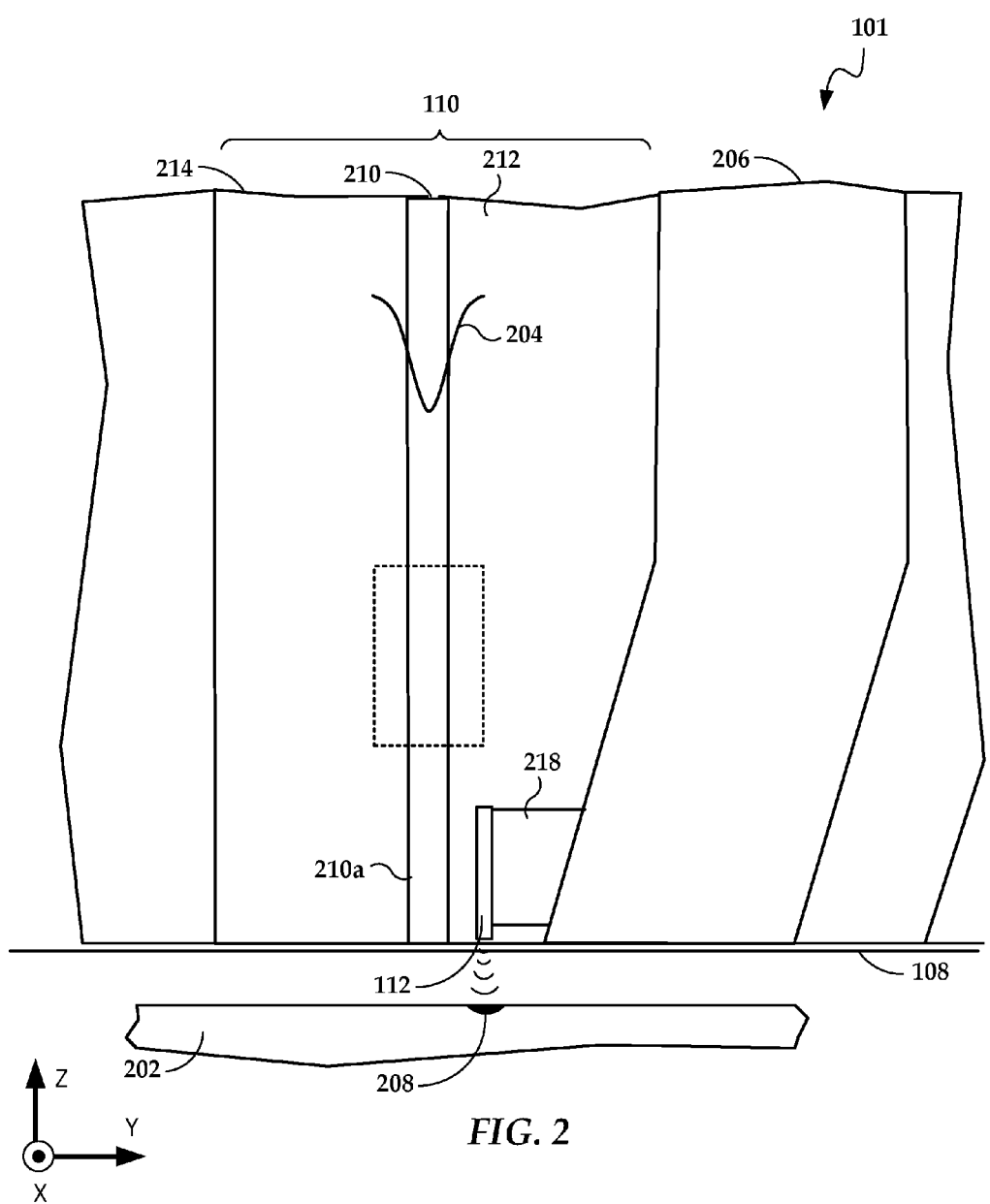
FIG. 2 is a cross-sectional view illustrating portions of a slider body near a plasmonic transducer according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (y-direction).

The waveguide system 110 includes a core layer 210 surrounded by cladding layers 212, 214. The core layer 210 and cladding layers 212, 214 may be made from dielectric materials such as $Al_2O_3$, $SiOxNy$, $SiO_2$, $Ta_2O_5$, $TiO_2$, ZnS, $Si_3N_4$, $Nb_2O_5$, $Hf_2O_3$, $Y_2O_3$, GaP, SiC, Si, etc. Generally, the dielectric materials are selected so that the refractive index of the core layer 210 is higher than refractive indices of the cladding layers 212, 214. This arrangement of materials facilitates efficient propagation of light through the waveguide system 110.

Figure 3A:
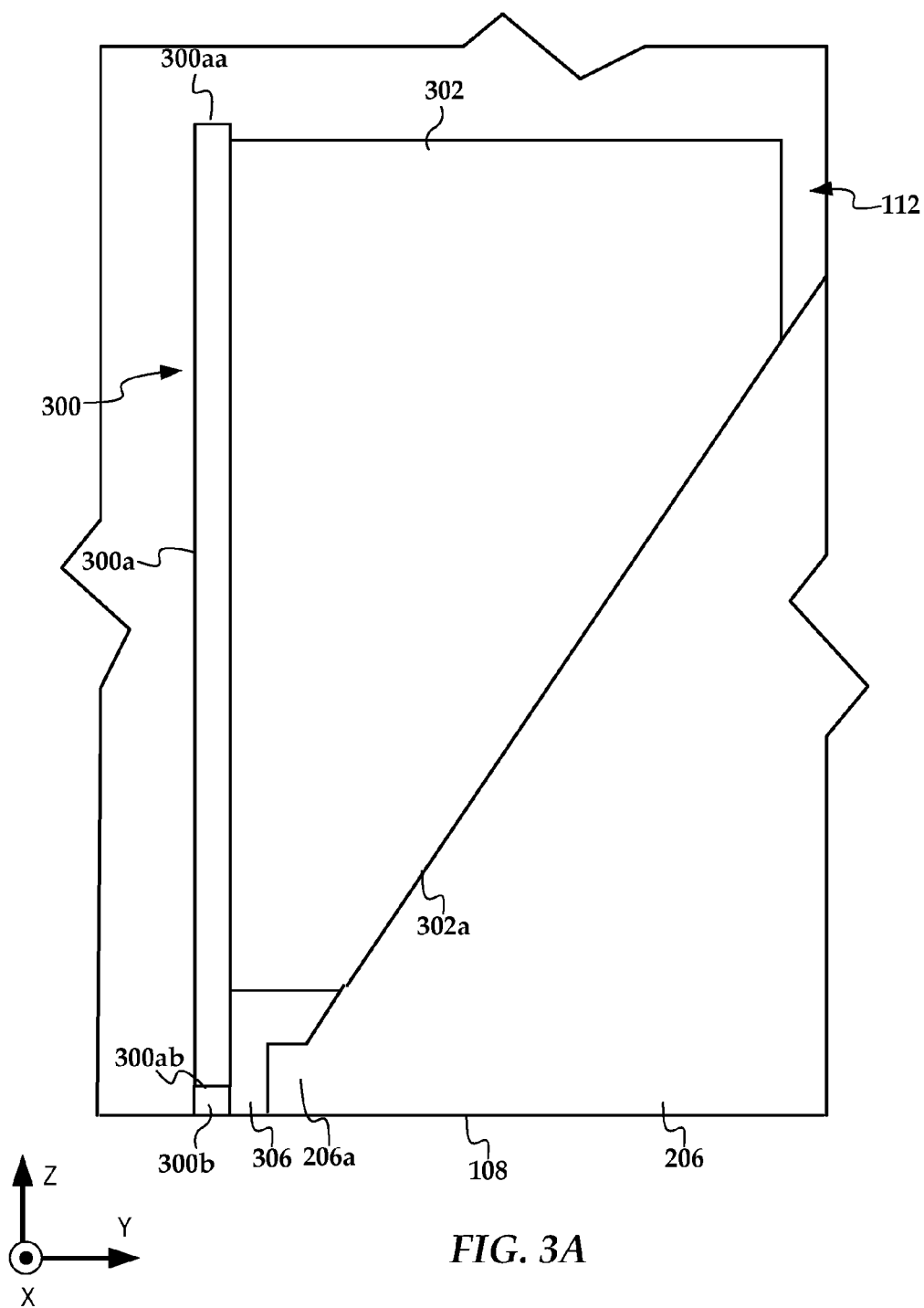
FIG. 3A is a close up cross-sectional view illustrating a near-field transducer and write pole according to an example embodiment.
Figure 3B:
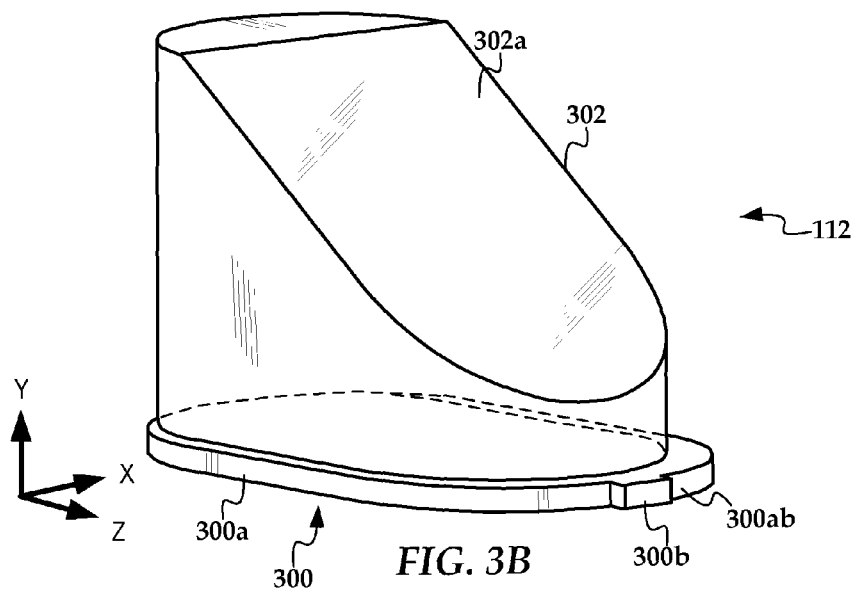
FIG. 3B is a perspective view of a near-field transducer according to an example embodiment.

In reference now to FIGS. 3A and 3B, cross-section and perspective views show details of an NFT 112 according to an example embodiment. As seen in FIG. 3B, the NFT 112 includes two parts: a unitary base part 300 and a unitary heat sink 302. The base part 300 includes an enlarged portion 300a that acts a collector of optical energy from a waveguide and/or focusing element. The enlarged portion 300a achieves surface plasmon resonance in response to the optical energy and the surface plasmons are directed to the medium via a peg 300b of the base part 300. In this example, the enlarged portion 300a is configured as an elongated plate with rounded (e.g., circular) ends. Other enlarged portion geometries may be used, including circular, rectangular, triangular, etc.

In the embodiments described below, the base part is formed as a unitary part, e.g., formed from a single manufacturing process. In previous designs, an extended rod was formed first, then an enlarged portion overlaid onto the rod to form geometry similar to that of base part 300. In contrast, the illustrated base part is formed by depositing a layer of plasmonic material (e.g., gold) and defining the outer contours in a single process (e.g., mask and etch, liftoff, etc.) to form a unitary part. This results in the unitary parts having a contiguous, homogeneous, and unified structure. This provides some advantages over a two-piece/two-process base part as will be described in greater detail below.

After formation of the base part 300, the heat sink 302 can be deposited using a second process. A sloped surface 302a of the heat sink 302 is formed as part of this second process. The sloped surface 302a interfaces with the write pole 206, as seen in FIG. 3A, which sinks heat away from the NFT 112. Also seen in FIG. 3A is a gap 306 between the write pole 206 and the base part 300 of the NFT 112 at the media-facing surface 108. The gap 306 may be filled with an insulating material such as a dielectric.

The formation of the NFT 112 using first and second processes reduces process content while still allowing for precisely defining downtrack dimension of the gap 306 between the NFT 112 and the write pole 206. Also seen in FIG. 3A is a misalignment between the base part 300 and the heat sink 302. In particular, the heat sink 302 is located closer to end 300aa of the base part as compared to end 300ab.

The heat sink 302 between the NFT 112 and write pole 206 helps ensure reliability by decreasing temperatures at peg 300b and tip of the write pole 206. It has been found that for designs where the heat sink completely covers the base part, the heat sink also resonates and generates a large electrical field near the media facing surface. This electrical field can impact NFT performance, reducing thermal gradient at the recording media. By making the heat sink 302 smaller and shifted away from the media facing surface 108, NFT efficiency can be improved. This shifting of the heat sink 302, as well as the protrusion 206a of the write pole being smaller than the offset, results in an L-shaped gap 306.

Figure 4A:
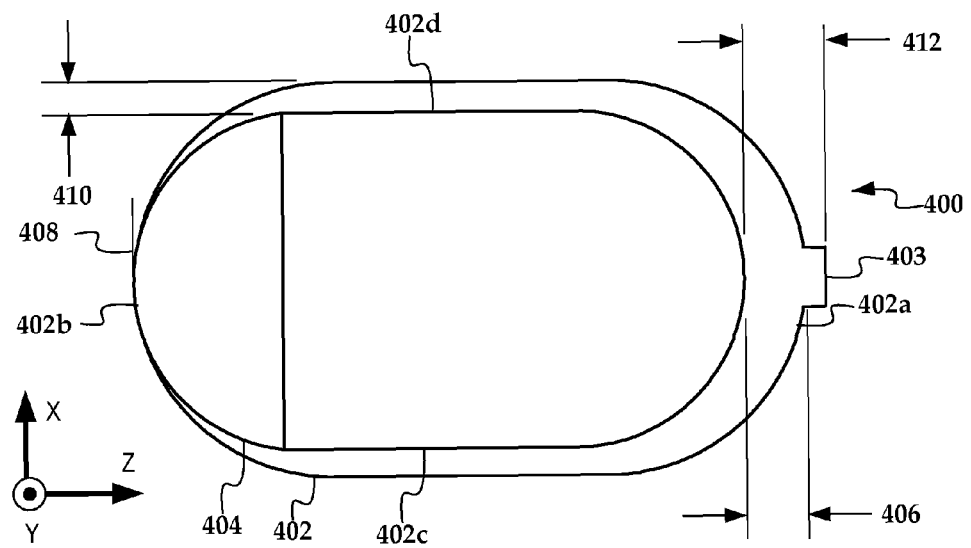
FIGS. 4A, 4B, 5A, 5B, and 6 are plan views of near-field transducers according to example embodiments.

In FIGS. 4A-6, diagrams show NFT embodiments with a reduced and shifted heat sink. One embodiment is shown in FIG. 4A, which is a plan view of an NFT 400a. The NFT 400a includes an enlarged portion 402 and a peg 403 protruding from a first edge 402a of the enlarged portion 402. The first edge 402a and the peg 403 face a recording medium (not shown). The enlarged portion 402 has a second edge 402b facing away from the recording medium. In this view (as well as in FIGS. 5 and 6), a crosstrack direction of the recording medium is vertical, and a downtrack direction of the recording medium is normal to the plane of the page.

A heat sink 404 is disposed on the enlarged portion. The heat sink 404 has an outline shape that matches that of the enlarged portion 402. In this example, the outline shapes of the enlarged portion 402 and heat sink 404 are elongated shapes (e.g., rectangles) with rounded (e.g., circular) ends, sometimes referred to as a capsule, discorectangle, or stadium shape. Other outline shapes may be used, including circular, rectangular, triangular, etc. The heat sink 404 is disposed at a first separation distance 406 from the first edge 402a of the enlarged portion and a second separation distance 408 (in this case, zero separation distance) from the second edge 402b of the enlarged portion. The first separation distance 406 is greater than the second separation distance 408.

Other dimensions of interest shown in FIG. 4A include a side separation distance 410 between the enlarged portion 402 and the heat sink 404. In this example, the side separation distance 410 is the same on first and second sides 402c, 402d of the enlarged portion 402. Also shown is a heat sink recess from the media-facing surface 412, which is a function of the first separation distance 406 and peg height. The various dimensions 406, 408, 410, and 412 can be changed to obtain a desired NFT performance in terms of, e.g., thermal gradient, heating/coupling efficiency, pole temperature, etc. For example, in one embodiment, the NFT 400 is about 680 nm from the tip of the peg 403 to edge 402b of enlarged portion 402, and about 400 nm between edges 402b-c. The side separation distance 410 is about 25 nm. The heat sink recess from the ABS 412 may be varied based on a number of factors, and in this example is about 100 nm. For purposes of discussion below, values of corresponding separations in other embodiments may be described relative to distance 412 of NFT 400.

Figure 4B:
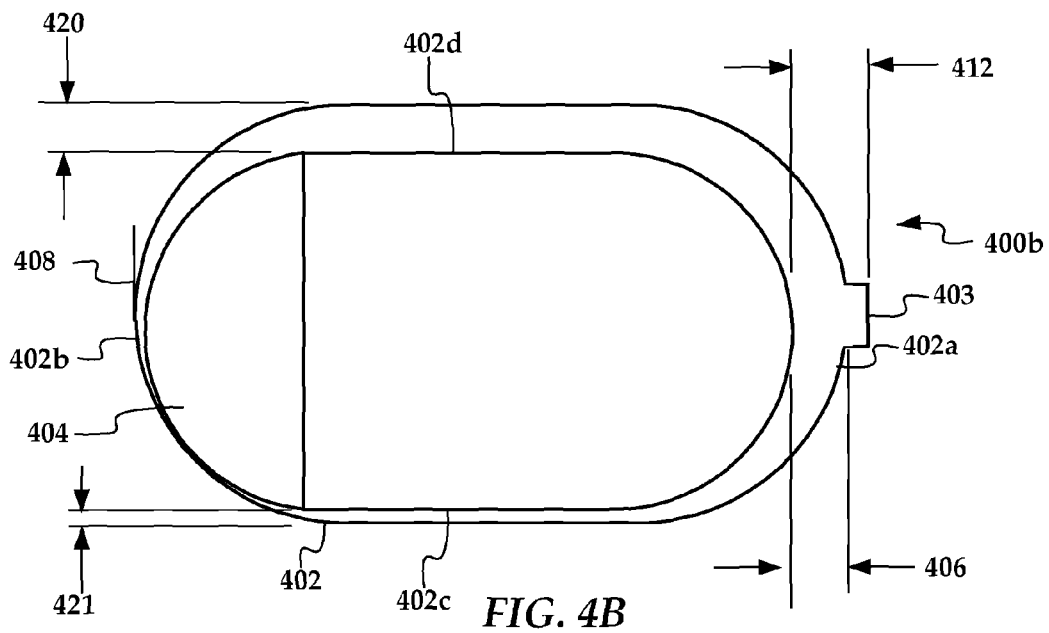

In FIG. 4B, an NFT 400b includes features similar to that of NFT 400a in FIG. 4A, those features being given the same reference numbers as corresponding features in FIG. 4A. One difference between NFTs 400a and 400b is that NFT 400b has unequal side separation distances 420 and 421. This side separation asymmetry may be used in applications such as shingled magnetic recording where the thermal spot in the media is intentionally made to be asymmetric. The other dimensions 406, 408, and 412 can be as described in relation to FIG. 4A.

Figure 5A:
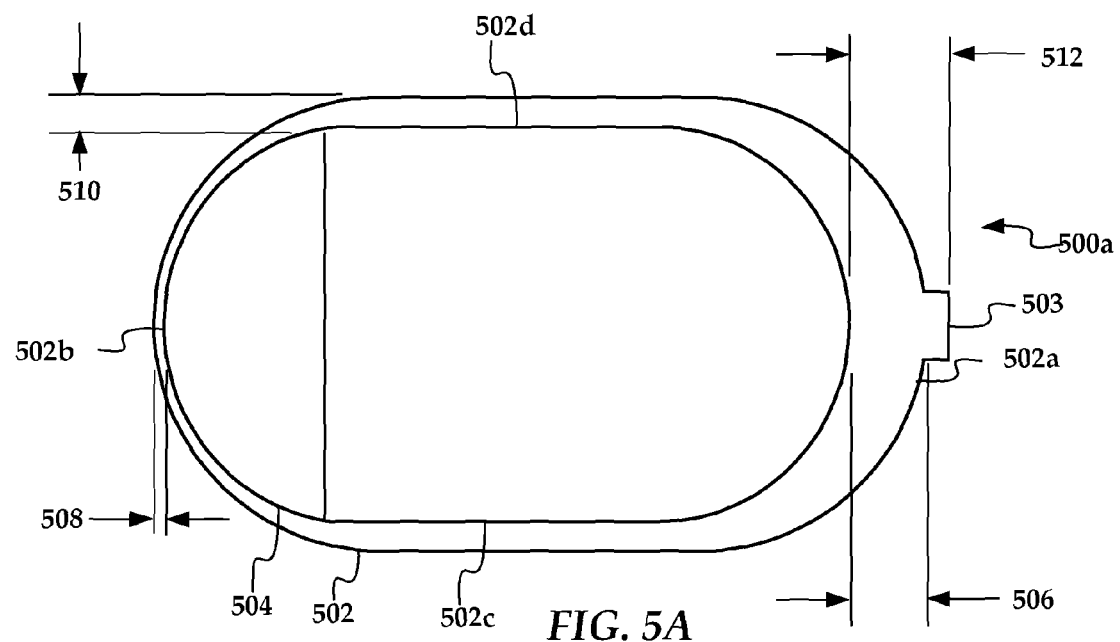

Another embodiment of an NFT 500a is shown in the plan view of FIG. 5A. The NFT 500a includes an enlarged portion 502 and a peg 503 protruding from a first edge 502a of the enlarged portion 502. The first edge 502a and the peg 503 face a recording medium (not shown). The enlarged portion 502 has a second edge 502b facing away from the recording medium. A heat sink 504 is disposed on the enlarged portion.

The heat sink 504 has an outline shape that matches that of the enlarged portion 502. In this example, the outline shapes of the enlarged portion 502 and heat sink 504 are elongated rectangles with rounded (e.g., circular) ends. Other outline shapes may be used, including circular, rectangular, triangular, etc. The heat sink 504 is disposed at a first separation distance 506 from the first edge 502a of the enlarged portion and a second separation distance 508 from the second edge 502b of the enlarged portion. The first separation distance 506 is greater than the second separation distance 508.

Other dimensions of interest shown in FIG. 5A include a side separation distance 510 between the enlarged portion 502 and the heat sink 504. In this example, the side separation distance 510 is the same on first and second sides 502c, 502d of the enlarged portion 502. Also shown is a pole to heat sink distance 512, which is a function of the first separation distance 506 and peg height. The various dimensions 506, 508, 510, and 512 can be changed to obtain a desired NFT performance in terms of, e.g., thermal gradient, heating/coupling efficiency, pole temperature, etc. For example, in one embodiment, the NFT 500 is about 680 nm from the tip of the peg 503 to edge 502b of enlarged portion 502, and about 400 nm between edges 502b-c. The side separation distance 510 is about 25 nm and the second separation distance 508 is about 10 nm. The heat sink recess from the ABS 512 may be varied based on a number of factors. In this example, the distance 510 is increased by 10 nm over distance 412 shown in FIG. 4.

Figure 5B:
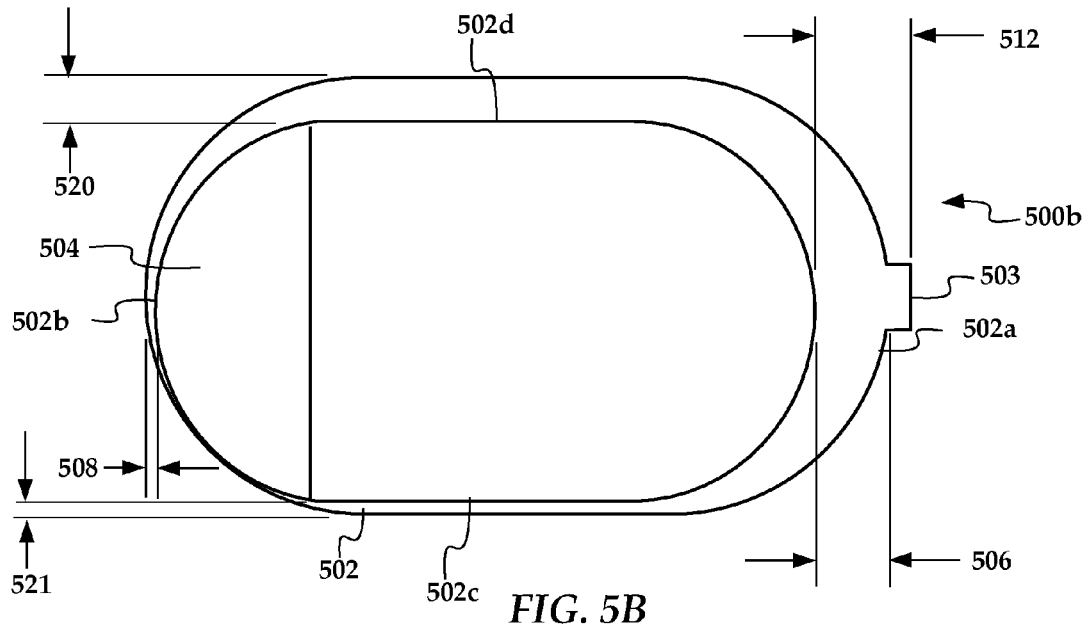

In FIG. 5B, an NFT 500b includes features similar to that of NFT 500a in FIG. 5A, those features being given the same reference numbers as corresponding features in FIG. 5A. One difference between NFTs 500a and 500b is that NFT 500b has unequal side separation distances 520 and 521. This side separation asymmetry may be used in applications such as shingled magnetic recording where the thermal spot in the media is intentionally made to be asymmetric. The other dimensions 506, 508, and 512 can be as described in relation to FIG. 5A.

Figure 6:
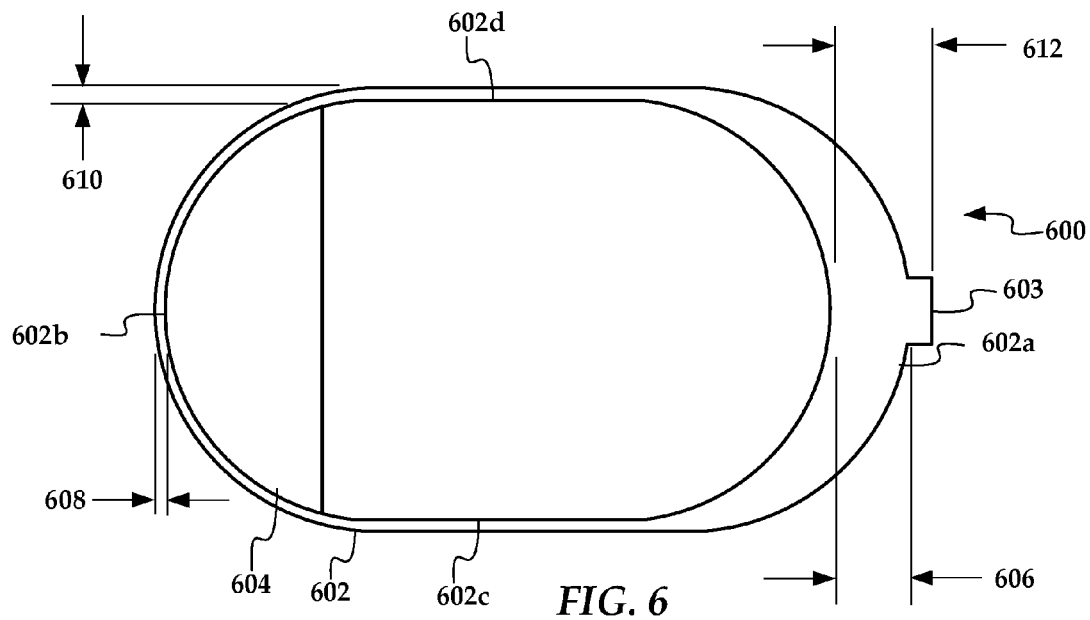

Another embodiment of an NFT 600 is shown in the plan view of FIG. 6. The NFT 600 includes an enlarged portion 602 and a peg 603 protruding from a first edge 602a of the enlarged portion. The first edge 602a and the peg 603 face a recording medium (not shown). The enlarged portion 602 has a second edge 602b facing away from the recording medium. A heat sink 604 is disposed on the enlarged portion.

The heat sink 604 has an outline shape that matches that of the enlarged portion 602. In this example, the outline shapes of the enlarged portion 602 and heat sink 604 are elongated rectangles with rounded (e.g., circular) ends. Other outline shapes may be used, including circular, rectangular, triangular, etc. The heat sink 604 is disposed at a first separation distance 606 from the first edge 602a of the enlarged portion and a second separation distance 608 from the second edge 602b of the enlarged portion. The first separation distance 606 is greater than the second separation distance 608.

Other dimensions of interest shown in FIG. 5 include a side separation distance 610 between the enlarged portion 602 and the heat sink 604. In this example, the side separation distance 610 is the same on first and second sides 602c, 602d of the enlarged portion 602. While not shown, the embodiment shown in FIG. 6 can utilize asymmetric side separation as shown in FIG. 5B. Also shown is a heat sink recess from the ABS 612, which is a function of the first separation distance 606 and peg height. The various dimensions 606, 608, 610, and 612 can be changed to obtain a desired NFT performance in terms of, e.g., thermal gradient, heating/coupling efficiency, pole temperature, etc. For example, in one embodiment, the NFT 600 is about 680 nm from the tip of the peg 603 to edge 602b of enlarged portion 602, and about 400 nm between edges 602b-c. The side separation distance 610 and the second separation distance 608 are both about 10 nm. The heat sink recess from the ABS 612 may be varied based on a number of factors. In this example, the distance 610 is about 110 nm, which increased by 10 nm over distance 412 shown in FIG. 4.

While the examples shown in FIGS. 4A-6 have been described as having particular dimensions, it will be understood the dimensions can vary from what has been shown and described. Generally, dimensions 408, 508, and 608 can be equal to or greater than zero, although may be limited to a dimension that does not significantly impact heat sinking, e.g., about 50 nm. Similarly, dimensions 410, 520, 421, 510, 520, 521, and 610 may be greater than zero, though may be limited to a dimension that does not significantly impact heat sinking, e.g., about 50 nm. Dimensions 412, 512, 612 can range from about 75 to about 125 nm.

Figure 7:
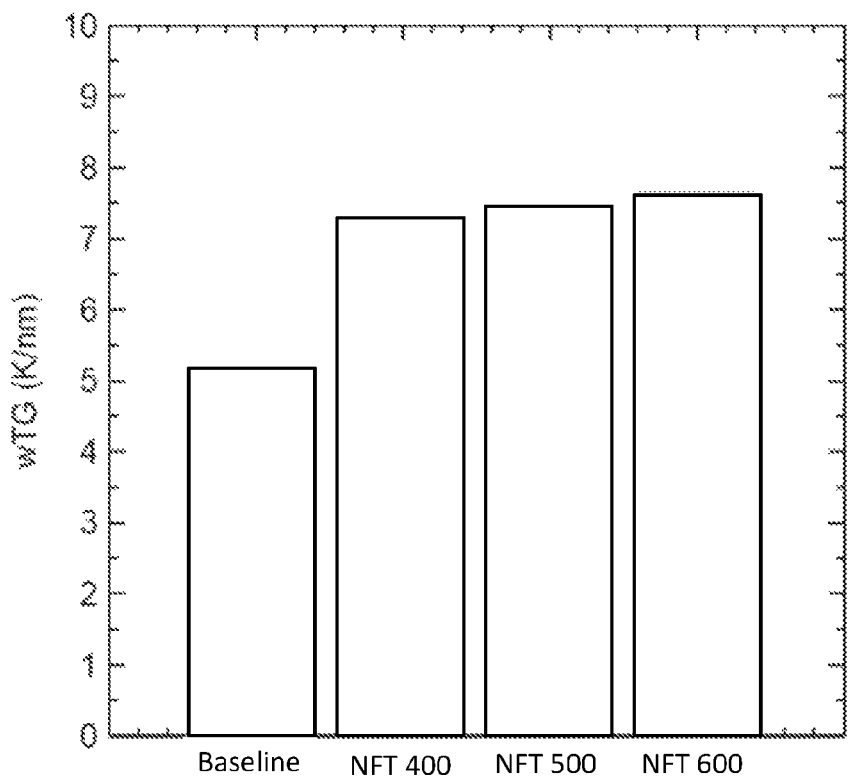
FIGS. 7-10 are bar charts illustrating simulation results of near-field transducer performance according to example embodiments.

In FIGS. 7-10, bar charts show a comparison of simulation performed on the NFTs 400a, 500a, and 600 shown in FIGS. 4-6, using the dimensions described above. The results are compared against a baseline, where the heat sink is the same size as and aligned with the elongated portion (e.g., dimensions 406, 408, and 410 in FIG. 4 are zero). The baseline also uses an elongated shape with rounded ends. The chart in FIG. 7 show thermal gradient of the hotspot in the recording medium during write (wTG). This increases for all the non-baseline configurations, with a maximum increase of 47% for NFT configuration 600.

Figure 8:
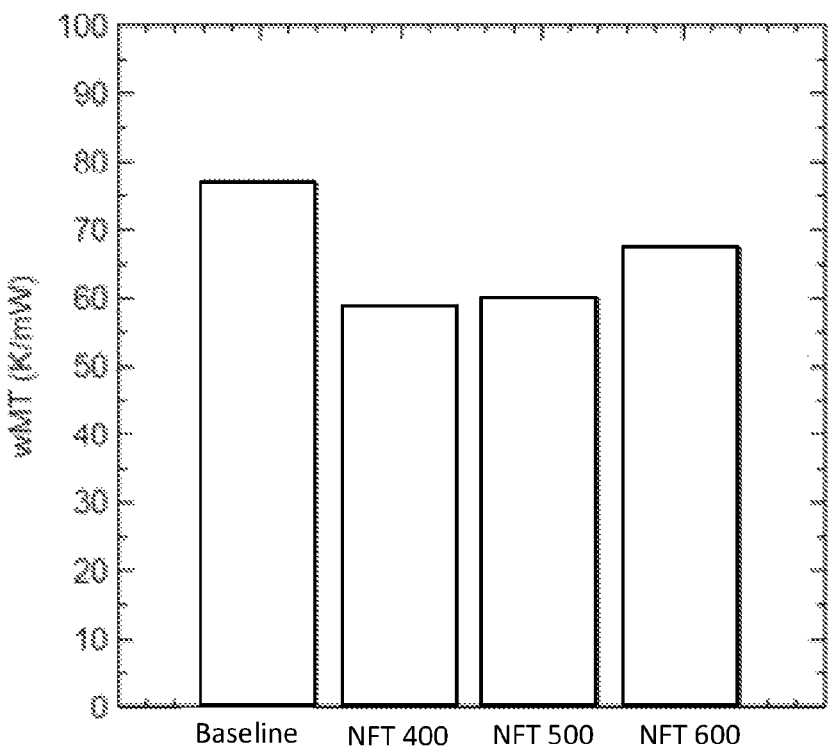
Figure 9:
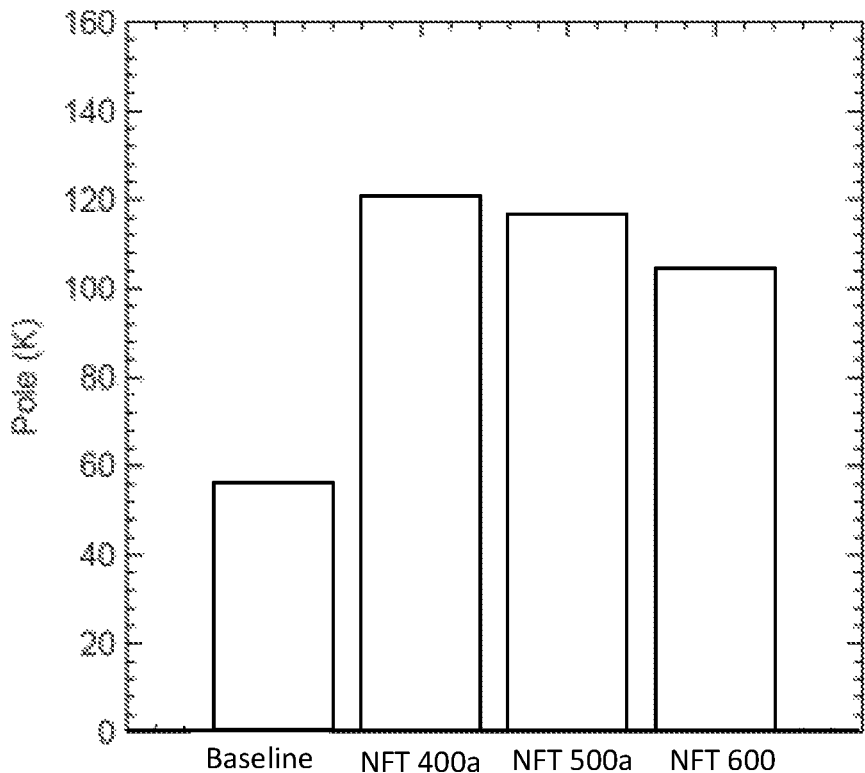
Figure 10:
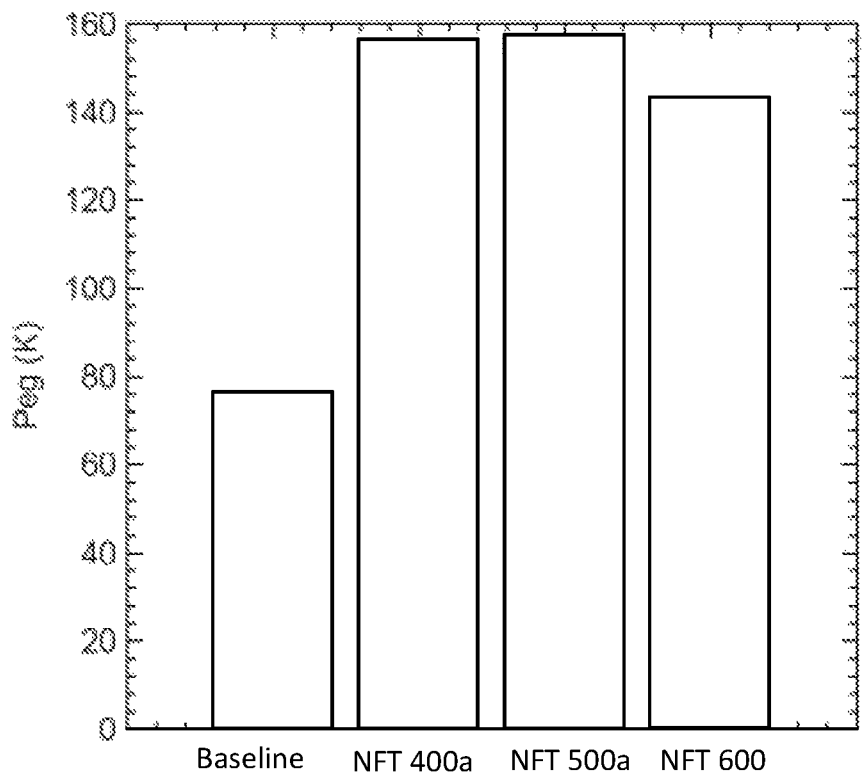
Figure 11:
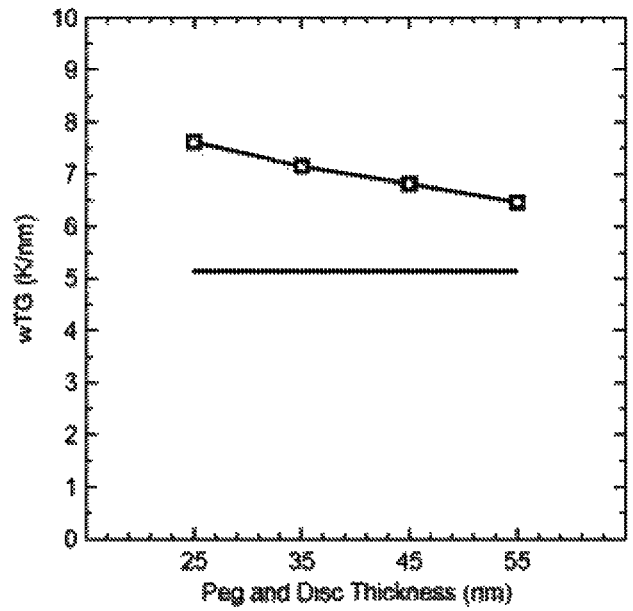
FIGS. 11-14 are graphs illustrating effects of base part thickness on transducer performance according to example embodiments.
Figure 12:
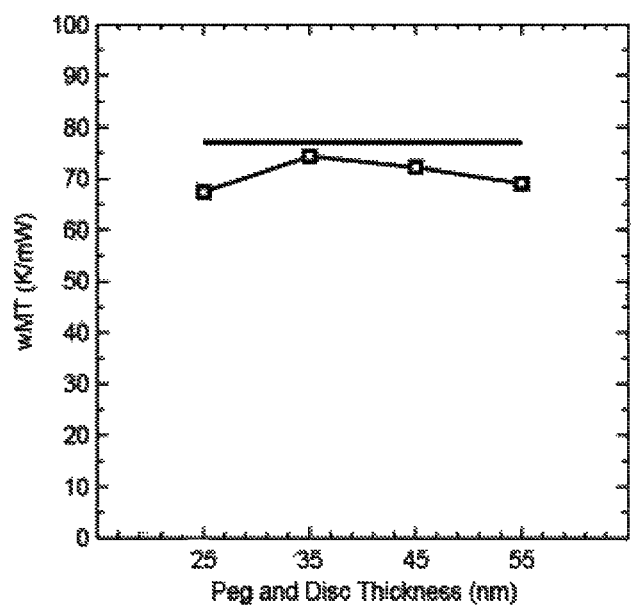
Figure 13:
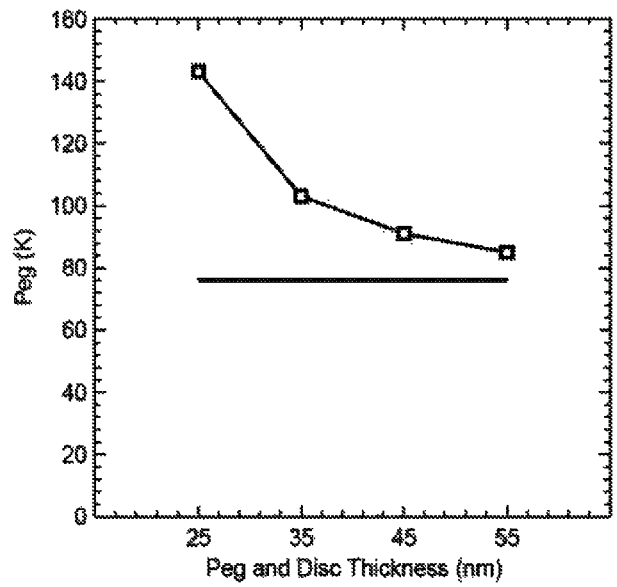
Figure 14:
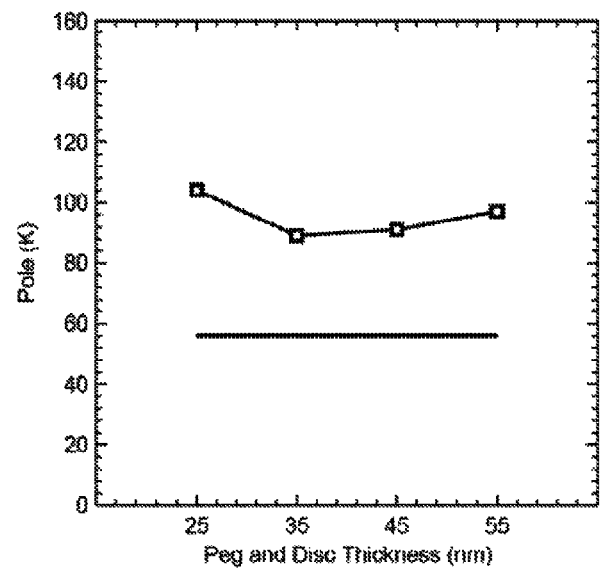

The chart in FIG. 8 shows media temperature during write (wMT), which decreases for the non-baseline configurations. The chart in FIG. 9 shows the write pole temperature for the different configurations, and the chart in FIG. 10 shows peg temperature for the different configurations. As these charts show, there is a penalty in media heating around 10% or less and peg/pole temperature of around 1.5 to 2×. In order to reduce the increase of temperature at the peg and write pole, a thicker base part (e.g., base part 300 in FIG. 3) may be used. As the graphs in FIGS. 11-14 show, increasing the base portion thickness decreases peg temperature (see FIG. 13) faster than decrease in thermal gradient (see FIG. 11). The tested configuration in FIGS. 11-14 was that of NFT 600, although the base portion thickening can be applied to any of the embodiments in FIGS. 4A-6 to achieve similar results. For the tested configuration, using a 35 nm base portion thickness provides a good balance of peg temperature and thermal gradient, as well as an increase in media temperature (see FIG. 12). The heat sink size and overlay can be adjusted to fit within process requirements. The base part thickness can be adjusted to tailor thermal gradient and peg temperature trade-off. Table 1 below shows additional results of the analysis.

TABLE 1

| Base portion thickness | Improvement in wTG per increase in temperature compared to baseline. |
|---|---|
| 25 nm | 0.71% per ° C. |
| 35 nm | 1.43% per ° C. |
| 45 nm | 2.12% per ° C. |
| 55 nm | 2.97% per ° C. |

The NFT designs described above may be made by plasmonic materials like Au, Ag, Cu, Al, or Rh. Peg recession is the one of the failure modes of those NFTs. It has also been found that the rate of peg recession is related to the volume of NFT. For example, more Au volume results in more chance of peg recession. As such, the designs may include additional features that reduce volume of the unitarily formed base parts. For example, diffusion barrier in between the unitary base part and the unitary heat sink and heat sinking body can reduce the Au volume attached to the peg. Moreover, the diffusion barrier could block the diffusion of Co or Fe from the writer to NFT.

Figure 15:
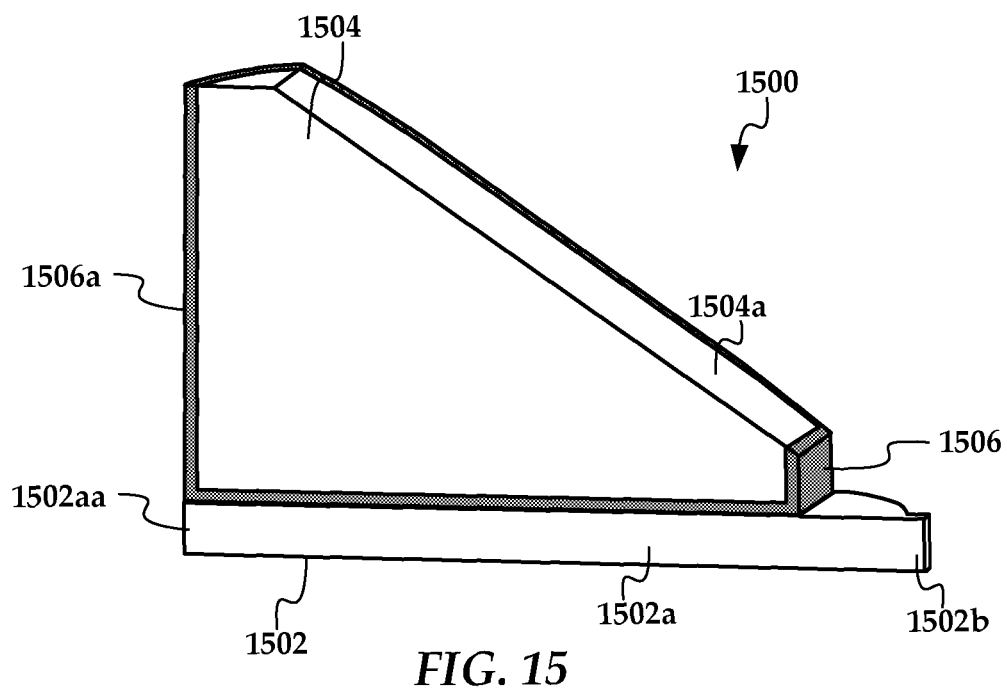
FIGS. 15 and 16 are cutaway views showing a near-field transducer according to another example embodiment.

In FIG. 15, a cutaway view shows an NFT 1500 according to an example embodiment. The NFT 1500 a unitary base part 1502 and a unitary heat sink 1504. The base part 1502 includes an enlarged portion 1502a and a peg 1502a. The enlarged portion 1502a is configured as an elongated plate with rounded (e.g., circular) ends, although other geometries may be used. A diffusion barrier 1506 is formed between the base part 1502 and heat sink 1504. The diffusion barrier 1506 also surrounds the sides of the heat sink 1504. Write-pole-facing surface 1504a of the heat sink 1504 is not covered by the diffusion barrier, although as shown below, a diffusion may be placed between this surface 1504a and a write pole.

Figure 16:
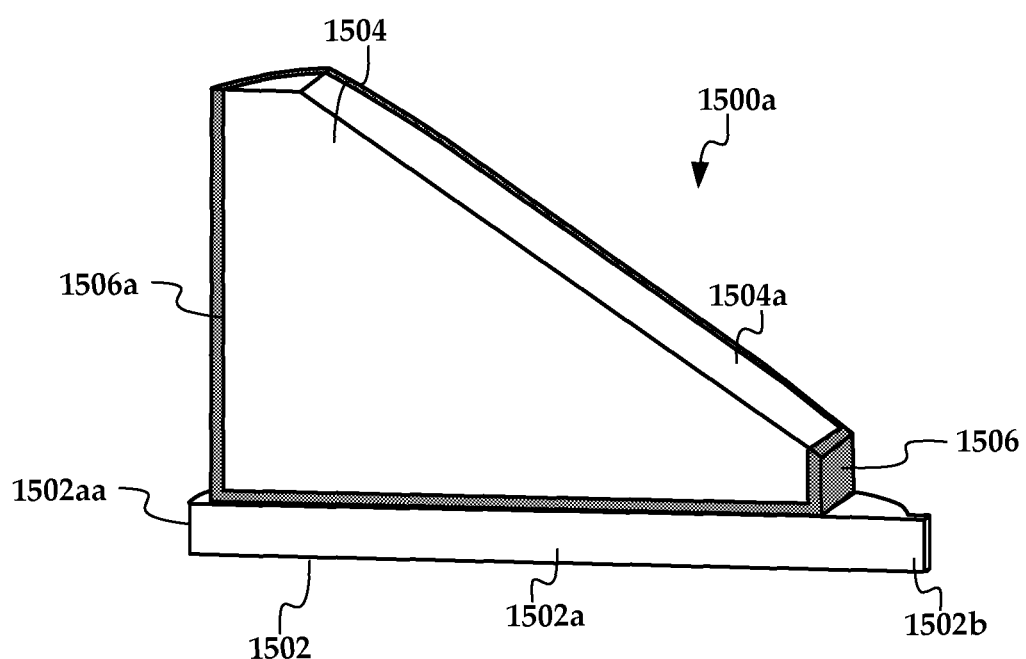

In FIG. 15, an edge 1502aa of the base part 1502a is flush with an edge 1506a of the diffusion barrier 1506. In FIG. 16, a similar NFT 1500a is shown, but with a gap between the edge 1502aa of the base part 1502a and the edge 1506a of the diffusion barrier 1506. This gap may be formed by making the heat sink 1504 in FIG. 16 smaller than the analogous heat sink 1504 in FIG. 15.

In either arrangement, the diffusion barrier 1506 may be made from a hard, noble metal such as Rh or an oxide thereof (RhO). In some embodiments, the heat sink 1504 and/or diffusion barrier 1506 in either arrangement may be made from a hard metal such as tungsten. A thermal analysis shows that the configuration in FIG. 15 with an Rh diffusion barrier 1506 has the following predicted performance: wTG=6.58 K/nm; peg temperature=95.1 K; and wMT=52.7 K/mW. In the same analysis, configuration in FIG. 16 with an Rh diffusion barrier 1506 has the following predicted performance: wTG=6.77 K/nm; peg temperature 101.1 K; and wMT 56.3 K/mW.

As pertains to the diffusion material being Rh or RhO, another analysis was performed on the configuration in FIG. 16 with an RhO barrier which has the following predicted performance: wTG=6.9 K/nm; peg temperature 103.8 K; and wMT 58.0 K/mW. This shows that configuration in FIG. 15 with the larger heat sink has a lower peg temperature by 6K, while the configuration in FIG. 16 with the smaller heat sink has a 6.8% higher efficiency (which allows for lower laser power to heat the recording medium). The use of RhO does not significantly affect performance.

An analysis was also performed using different materials for the diffusion barrier 1506 and heat sink 1504. The results are shown below in Table 2, in which the 'small' heat sink size corresponds to a configuration as in FIG. 16 and the 'large' heat sink size corresponds to a configuration as in FIG. 15. The NFT base part 1502 in all these cases is formed of gold. The third row shows the best performance for the W barrier, but exhibits a 23K greater peg temperature than the Rh barrier.

TABLE 2

| Heat sink size | Heat sink material | Diffusion barrier matl | wTG (K/nm) | Peg T (K) | wMT (K/mW) |
|---|---|---|---|---|---|
| large | Au | W (10 nm) | 6.53 | 121.9 | 48.0 |
| large | W | W | 6.14 | 157.5 | 39.9 |
| small | Au | W (10 nm) | 6.75 | 124.6 | 51.5 |
| small | W | W | 6.46 | 159.1 | 43.7 |
| small | Au | Rh (10 nm) | 6.77 | 101.1 | 56.3 |

In the previous examples where the heat sink was formed of a different material than the diffusion barrier, the latter had a 10 nm thickness. An analysis also considered three different thicknesses of an Rh barrier—5 nm, 10 nm, and 20 nm. The differences in wTG were not significant for the different thicknesses. A 5 nm barrier exhibited 4 K lower peg temperature and 2 K/mW higher wMT (about 3%) compared a 15 nm barrier.

Figure 17:
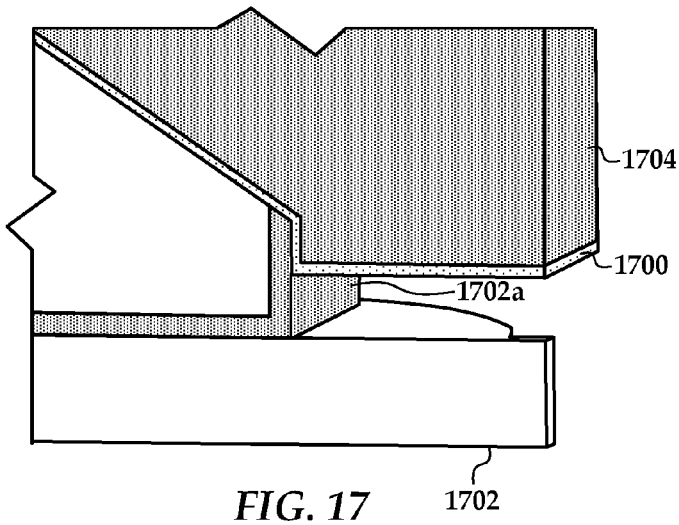
FIG. 17 is a cutaway view showing a diffusion barrier between a near-field transducer and a write pole according to an example embodiment.

As noted above, the surface 1504a of the heat sink 1504, which is thermally coupled to a write pole, did not show a diffusion barrier. Such a barrier might be useful to prevent diffusion between the NFT and write pole. In the cutaway view of FIG. 17, a write pole to NFT diffusion barrier 1700 is shown. An NFT 1702 as previously described (e.g., with diffusion barrier 1702a) is proximate a write pole 1704, with the diffusion barrier 1700 therebetween. The barrier 1700 is thin enough to allow heat transfer from the NFT 1702 to the write pole 1704, but is formed from a material that prevents diffusion, such as Ru. Materials such as Ru are pure optical metals similar to that used in the write pole 1704 (e.g., FeCo). An analysis shows the use of the heat sink diffusion barrier 1700 formed of 10 nm thick Ru changes performance indicators above (wTG, Peg T, wMT) less than 1%.

Figure 18:
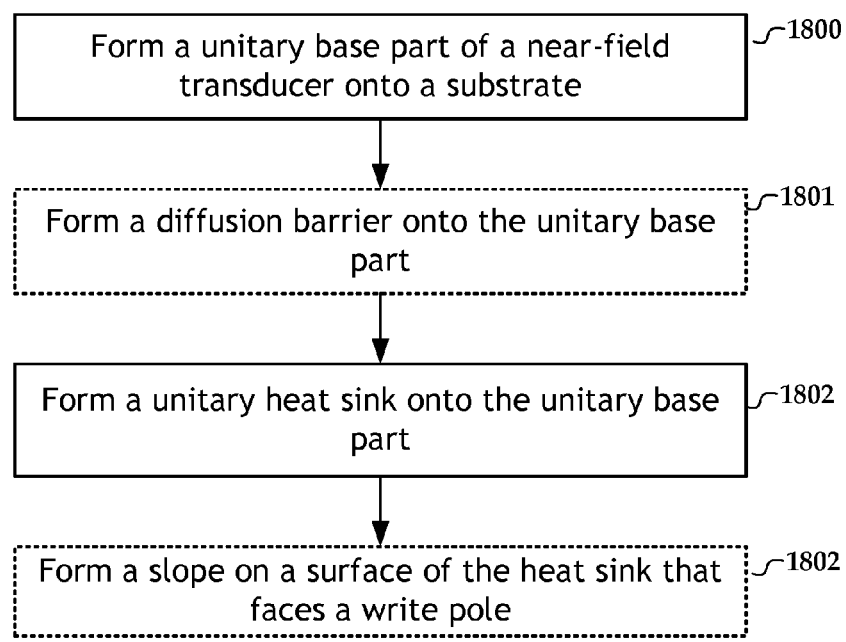
FIG. 18 is a flow chart illustrating a method according to an example embodiment.

FIG. 18 is a flow diagram of a method in accordance with an embodiment. The method involves forming 1800 a unitary base part of a near-field transducer onto a substrate. The unitary base part includes an enlarged portion and a peg protruding from an edge of the enlarged portion. Optionally, a diffusion barrier may be formed 1801 onto the unitary base part. A unitary heat sink of the near-field transducer is formed 1802 onto the unitary base part, e.g., directly on to the base part or onto a diffusion barrier if used. The unitary heat sink has an outline shape (e.g., stadium shape) matching that of the enlarged portion. The method may optionally involve forming 1802 a slope on a surface of the heat sink that faces a write pole.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. For example, the values provided may vary at least due to manufacturing tolerances specific to processes used to form particular components. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A near-field transducer comprising:
an enlarged portion and a peg protruding from a first edge of the enlarged portion that faces a recording medium, the enlarged portion comprising a second edge facing away from the recording medium; and
a heat sink disposed on the enlarged portion and having an outline shape that matches that of the enlarged portion, the heat sink disposed at a first separation distance from the first edge of the enlarged portion and a second separation distance from the second edge of the enlarged portion, the first separation distance being greater than the second separation distance.

2. The near-field transducer of claim 1, wherein the enlarged portion and the peg comprise a contiguous and unified structure.

3. The near-field transducer of claim 1, wherein the outline shape comprises a stadium shape.

4. The near-field transducer of claim 1, wherein the second separation distance is zero.

5. The near-field transducer of claim 1, wherein the heat sink is disposed at first and second non-zero side separation distances from first and second sides of the enlarged portion.

6. The near-field transducer of claim 1, further comprising a diffusion barrier between the enlarged portion and the heat sink.

7. The near-field transducer of claim 6, wherein the diffusion barrier surrounds sides of the heat sink.

8. A write head, comprising:
a write pole extending towards a media-facing surface that faces a recording medium; and
a near-field transducer, comprising:
an enlarged portion and a peg protruding from a first edge of the enlarged portion at the media-facing surface, the enlarged portion comprising a second edge facing away from the media-facing surface; and
a heat sink disposed on the enlarged portion and having an outline shape that matches that of the enlarged portion, the heat sink disposed at a first separation distance from the first edge of the enlarged portion and a second separation distance from the second edge of the enlarged portion, the first separation distance being greater than the second separation distance.

9. The write head of claim 8, wherein the second separation distance is zero.

10. The write head of claim 8, the heat sink further comprising a sloped surface that faces the write pole.

11. The write head of claim 10, further comprising a diffusion barrier between the sloped surface and the write pole.

12. The write head of claim 8, wherein the write pole comprises a protrusion extending towards the peg to form an L-shaped gap between the peg, the enlarged portion, the heat sink, and the protrusion.

13. The write head of claim 12, wherein the L-shaped gap is filled with a dielectric.

14. The write head of claim 8, further comprising a diffusion barrier between the enlarged portion and the heat sink.

15. The write head of claim 14, wherein the diffusion barrier surrounds sides of the heat sink.

16. The write head of claim 14, wherein the diffusion barrier is between 5 nm and 15 nm.

17. The write head of claim 14, wherein the diffusion barrier comprises a layer of Rh.

18. The write head of claim 14, wherein the enlarged portion and the peg comprise a contiguous and unified structure.

19. The write head of claim 14, wherein the outline shape comprises a stadium shape.

* * * * *